(12) United States Patent
Grewer et al.

(10) Patent No.: US 8,698,795 B2
(45) Date of Patent: Apr. 15, 2014

(54) INTERACTIVE IMAGE SEGMENTATION

(75) Inventors: Ruediger Grewer, Hamburg (DE);
Sebastian Dries, Hamburg (DE); Daniel Bystrov, Hamburg (DE); Vladimir Pekar, Toronto (CA); Torbjoern Vik, Hamburg (DE); Heinrich Schulz, Hamburg (DE); Michael Kaus, Madison, WI (US)

(73) Assignee: Koninklijke Philips N.V., Eindhoven (NL)

( * ) Notice: Subject to any disclaimer, the term of this patent is extended or adjusted under 35 U.S.C. 154(b) by 659 days.

(21) Appl. No.: 12/863,462

(22) PCT Filed: Jan. 7, 2009

(86) PCT No.: PCT/IB2009/050042
§ 371 (c)(1),
(2), (4) Date: Jul. 19, 2010

(87) PCT Pub. No.: WO2009/093146
PCT Pub. Date: Jul. 30, 2009

(65) Prior Publication Data
US 2010/0295848 A1 Nov. 25, 2010

Related U.S. Application Data

(60) Provisional application No. 61/023,106, filed on Jan. 24, 2008.

(51) Int. Cl.
*G06T 15/00* (2011.01)
*G06K 9/00* (2006.01)

(52) U.S. Cl.
USPC .......................................... 345/419; 382/128

(58) Field of Classification Search
CPC ........... G06T 2207/20101; G06T 2207/20128; G06T 2207/30004; G06T 7/0081; G06T 7/0012; G06T 7/0083; G06T 19/00; G06T 17/20; G06T 17/00; G06T 15/10; G06T 15/00
See application file for complete search history.

(56) References Cited

U.S. PATENT DOCUMENTS 7,142,208 B2 11/2006 Lorenz
7,277,582 B2 10/2007 Paragios
(Continued)

FOREIGN PATENT DOCUMENTS

WO 2005038711 A1 4/2005

OTHER PUBLICATIONS

Chen, M.; 3-D Deformable Registration Using a Statistical Atlas with Applications in Medicine; 1999; Thesis to the Robotics Institute of Carnegie Mellon University; 164 pages.
(Continued)

*Primary Examiner* — Kee M Tung
*Assistant Examiner* — Frank Chen

(57) ABSTRACT

When adapting models of anatomical structures in a patient for diagnosis or therapeutic planning, an atlas (26) of predesigned anatomical structure models or image volumes can be accessed, and a segmentation of one or more such structures can be selected and overlaid on an a 3D image of corresponding structure(s) in a clinical image (52) of a patient. A user can click on an initially unapproved segmentation 5 landmark (72) on the patient image (52), reposition the unapproved landmark, and approve the repositioned landmark. Remaining unapproved landmarks (72) are then repositioned as a function of the position of the approved landmark (92) using one or more interpolation techniques to adapt the model to the patient image on the fly.

25 Claims, 7 Drawing Sheets

(56) References Cited

U.S. PATENT DOCUMENTS

| | | | |
|---|---|---|---|
| 2001/0029333 A1* | 10/2001 | Shahidi | 600/429 |
| 2003/0174872 A1* | 9/2003 | Chalana et al. | 382/128 |
| 2005/0069183 A1 | 3/2005 | Ashton | |
| 2005/0111757 A1* | 5/2005 | Brackett et al. | 382/294 |
| 2007/0211940 A1 | 9/2007 | Fluck et al. | |
| 2010/0061510 A1* | 3/2010 | Nord et al. | 378/65 |

OTHER PUBLICATIONS

Jaume, S., et al.; Labeling the Brain Surface Using a Deformable Multiresolution Mesh; 2002; MiCCAI; LNCS 2488; pp. 451-458.

Ji, H., et al.; An Interactive Segmentation Method for Medical Images; 2002; ICSP'02 Proceedings; IEEE: pp. 580-583.

McInerney, T., et al.; A Dynamic Finite Element Surface Model for Segmentation and Tracking in Multidimensional Medical Images with Application to Cardiac 4D Image Analysis; 1995; Computerized Medical Imaging and Graphics; 19(1)69-83.

Pekar, V., et al.; Automated Model-Based Organ Delineation for Radiotherapy Planning in Prostatic Region; 2004; Int. J. Radiation Oncology Biol Phys; 60(3)973-980.

Qatarneh, S.; Development of a Whole Body Atlas for Radiation Therapy Planning and Treatment Optimization; 2006; Thesis to the Division of Medical Radiation Physics Dept. of Oncology-Pathology-Stockholm University; pp. 7-11.

Snell, J. W., et al.; Segmentation of the brain from 3D MRI using a hierarchical active surface template; 1994; Proc. of SPIE; vol. 2167—Medical Imaging; pp. 2-9.

Van Ginneken, B., et al.; Interactive Shape Models; 2003; Proc. of SPIE; vol. 5032—Image Processing; pp. 1206-1216.

Weese, J., et al.; Shape Constrained Deformable Models for 3D Medical Image Segmentation; 2001; IPMI-LCNS; pp. 380-387.

* cited by examiner

INTERACTIVE IMAGE SEGMENTATION

CROSS REFERENCE TO RELATED APPLICATIONS

This application claims the benefit of U.S. provisional application Ser. No. 61/023,106 filed Jan. 24, 2008, which is incorporated herein by reference.

The present application finds particular utility in medical imaging systems. However, it will be appreciated that the described technique(s) may also find application in other types of imaging systems, scanning systems, and/or other medical applications.

Interactive segmentation tasks are commonly performed by adapting a stored segmentation to previously unseen image data. Depending on the complexity of the segmentation, this is a time-consuming procedure for the user. Applications for performing interactive, manual segmentation of medical image data include organ and beam planning delineation in radiation therapy planning, landmark definition in training automated segmentation algorithms, such as Smart-Exam, and structure identification in manual or semi-automated quantification (measurement) tools.

Instead of starting each of a plurality of similar segmentations for any new case from scratch, it is common to start with a stored (reference) segmentation. The reference segmentation may be derived from a model or copied from a previous segmentation. The reference segmentation shares position features with the intended new segmentation, and the relationships between the features are usually conserved to some extent. However, feature relationships are not taken into account under conventional methods.

Typically, the user has to adapt any part of the reference segmentation to the new image data, starting with the reference position for each of the features. Thus the relationships between the features are lost during the procedure, which is at least undesirable but can as well lead to confusion if there is relatively large change between the reference and the new segmentation as the intermediate stage displays a topographically destruct segmentation.

Anatomical atlases are useful for many clinical applications. For example, anatomy contouring in radiation therapy planning can be made much more efficient and reproducible by automatically transferring relevant anatomy delineations in the form of 3-D models from an atlas to a planning image. However, fully automatic anatomy delineation using conventional methods has proven difficult due to a need for non-linear transformations, weak image contrast, normal and pathological anatomical variability, image artifacts, etc.

There is an unmet need in the art for systems and methods that facilitate overcoming the deficiencies noted above.

In accordance with one aspect, a system for interpolation of medical image segmentation landmarks includes a memory that stores 3D reference image volumes of anatomical structures, the reference image volumes each including a set of reference landmarks, a display that presents a view of a patient image volume and a view of a reference image volume, and a processor that overlays the set of reference landmarks of the reference image volume and the patient image volume. The system further includes a user input device that a user employs to reposition one or more of the overlaid landmarks in a corresponding position on the patient image and approve the one or more repositioned landmark. The processor updates an interpolation transform between the reference image volume and the patient image volume as a function of the repositioning of the one or more approved landmarks, and updates the positions of one or more unapproved overlaid landmarks in accordance with the updated interpolation transform.

In accordance with another aspect, a method of interactively updating a segmentation of a patient image volume includes retrieving a reference image segmentation comprising a set of reference landmarks on the reference image volume, transferring the set of reference landmarks onto the patient image volume as unapproved landmarks in a patient image volume segmentation, and receiving input related to repositioning of at least one unapproved landmark. The method further includes receiving input updating the status of the repositioned landmark as an approved landmark, interpolating position updates for remaining unapproved landmarks as a function of the position of the approved landmark position, and updating the positions of remaining unapproved landmarks as a function of the interpolation.

According to another aspect, an interactive patient image volume registration apparatus includes means for presenting a reference image volume segmentation, overlaid on a patient image volume image, to a user, and means for permitting the user to select an unapproved landmark overlaid on the patient image volume, reposition the selected unapproved landmark, and approve the repositioned unapproved landmark. The apparatus further includes means for iteratively interpolating new positions for remaining unapproved landmarks as a function of the position of each approved landmark, and updating the positions of the remaining unapproved landmarks. The means further permits a user to approve all remaining unapproved landmarks when the user is satisfied with the adaptation of the patient image volume segmentation.

One advantage is that image registration is performed interactively on the fly.

Another advantage resides in increased automation of the registration process.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

Figure 1:
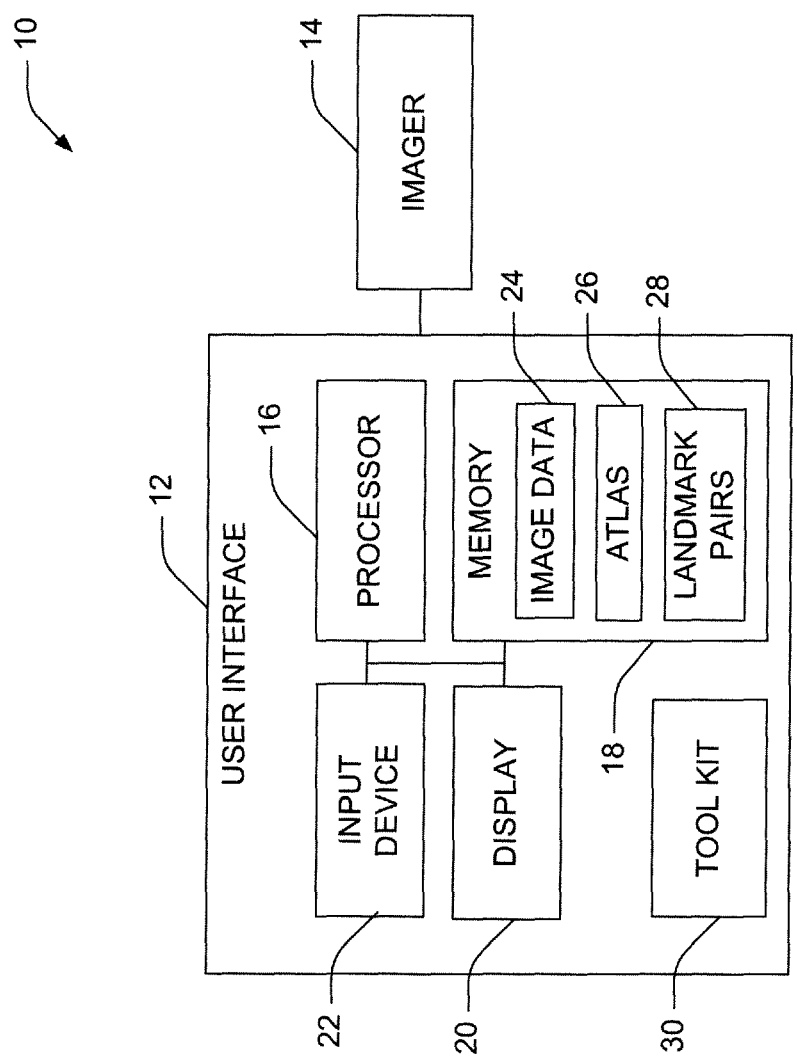
FIG. 1 illustrates a manual editing tool for elastically registering a contour(s) selected from an atlas of anatomical structures to 3D clinical images.

FIG. 1 illustrates a manual editing system 10 for elastically registering a contour(s) selected from an atlas 26 of anatomical structures to 3D clinical images. The editing tool provides dynamic display plane updates in real time. The editing system employs interpolation methods to augment a user interface 12 that is used to create the new segmentation. After any manual update of the new segmentation, the modified portion is marked "accepted." All portions of the new segmentation still not accepted are then automatically updated from the stored segmentation. This update is performed using an interpolation calculated from the already accepted portions of the new segmentation that are common to the stored segmentation. Thus, the structural integrity of the transferred segmentation is maintained. Additionally, the display geometry of the stored and new image data can be aligned by executing an additional interpolation for easier visual cross referencing.

In one embodiment, the user interface 12 includes functionality for progressive image segmentation using the deformable anatomical atlas 26. Atlas adaptation is performed progressively, where anatomical structures whose segmentation requires less interaction are processed first. The results of segmentation are used to update the positions of the remaining structures on-the-fly. The process is repeated until all segmentations are confirmed by the user.

The system includes the user interface 12, which is coupled directly or indirectly to an imager 14. For instance, the imager 14 can be a computed tomography (CT) scanning system or a variant thereof, a magnetic resonance imaging (MRI) system or variant thereof, or any other suitable imager for generating 2D or 3D images of a patient or portion of a patient. The images can come directly from the imager or from a medical records database The user interface 14 includes a processor 16 that executes machine-readable instructions and/or routines, which are stored in a memory 18, for manipulating a 3D image of one or more organs in a patient. Such images are displayed to a user via a display 20, and the user is permitted to manipulate the images using an input device 22. The memory 18 additionally stores information and/or routines related to the atlas 26, including 3D images and/or maps of various organs, which are then used as a template on which a corresponding image 24 of a patient's organ(s) or other anatomical structure(s) is overlaid. Additionally, the memory stores information and/or routines related to displaying patient and atlas images to the user via the display 20, as well as routines for manipulating atlas and/or patient images in response to user input via the input device 22. Moreover, the memory stores image data 24 related to the image of the patient and landmark data 28 describing landmark pairs and the like. The input device can be, for example, a keyboard and cursor, a stylus, a mouse, or some other suitable input device.

The atlas 26 can include models of individual or combinations of anatomical structures, (e.g., organs such as the heart, lung(s), brain, spleen, liver, intestine, stomach, gall bladder, etc.; other structures such as bone(s), muscle, etc.), and such structures can be parameterized. Further, a plurality of models can be provided for various anatomical types, e.g., corresponding to adult, child, obese, skinny, male, female, etc. For instance, parameterization can be performed using a mesh technique, non-uniform rational B-splines (NURBS), or some other parameterization protocol. The system 10 facilitates providing a user with a reliable, intuitive, and interactive 3D editing application.

The system 10 permits 3D manipulation of a contoured image volume model, which in turn permits a user to manipulate contours of an image volume model in multiple planes, rather than in just one plane. For instance, a user accesses a virtual tool kit 30 with electronically-defined tools to push, pull, or otherwise adjust the model contour in three dimensions. For example, the virtual tools define surfaces of various radii, shapes, and sizes, including a single point, that can press or pull the contour to mold its shape. The user can push or pull the tool along the displayed plane or at an angle to the displayed plane. As a point on the contour is pulled or pushed off of one or more of the displayed planes, the tool automatically changes the displayed plane(s) so that the user can see a desired image volume contour portion superimposed on a diagnostic image volume throughout the period during which the contour portion is being manipulated.

The image volume can comprise one or multiple anatomical structures, e.g., adjacent organs. For instance, a user can pull a specific point on a contour of a contoured reference model to a corresponding point on an image of an anatomical structure in a patient. In one example, a significant point may be a spinous process on a vertebra, and the user can drag a corresponding process on the reference model to the spinous process on the patient's vertebra to more closely align the model to the actual image volume. Between constrained points or meshes, the model elastically deforms. Reference models, which can comprise one or more anatomical structures, are generated from patient data, such as scans or other images of the structure(s). In one embodiment, a number of scans or images of one or more subjects are employed to generate one or more average, or "normal," model(s) of the structure(s).

The displayed slice or surface need not be planar, but may be curved as well. For instance, a contour surface can be curved to match the curvature of a spine. In one embodiment, anatomical structure outlines are stored in the atlas individually, and can be combined or assembled by the user to form an area of interest. In another embodiment, outlines for anatomical structures in commonly imaged areas can be preassembled, such that the outlines for all organs in preassembled area can be downloaded, uploaded, or otherwise accessed as a group.

In one embodiment, relationships between the features of the segmentation (e.g., the model) are maintained to conserve the topographic integrity of displayed features. The user employs the system 10 to perform a rough manual model adaptation by pushing or pulling one or more points or features on the reference model or segmentation to respective desired locations that correspond to the patient image volume. Any part of the reference model that is adapted to the patient image interactively, and thus approved by the user as part of the new patient segmentation, is used to interpolate all other (e.g., not already approved or accepted) features of the reference segmentation on display. Approved and interpolated features are displayed in a clearly distinct way (e.g. by different color, etc.) to indicate their respective states. If there is image data linked to the reference segmentation, the display of the reference and the new patient image data can also be linked by interpolation, as a second means of support.

According to another embodiment, landmark segmentation (anatomically meaningful points in volumetric image data) is used to facilitate user approval of selected points or features. However, it is to be appreciated that the described systems and methods are also applicable to other segmentation objects, such as surface meshes, volume patches, bounding boxes for scan planning, bounding cones for beam planning, and the like. That is, the new (and reference) image data need not be confined to 3D volume data.

Additionally, the processor 16 may employ different interpolation techniques for different types of tissue represented in the patient image volume. For instance, when interpolating the position of unaccepted landmarks corresponding to bone tissue, a principle component transform can advantageously be used. A rigid transform can be advantageously employed when interpolating position updates for unaccepted landmarks corresponding to brain tissue. Additionally or alternatively, an elastic transform may be employed when interpolating position updates for unaccepted landmarks corresponding to soft tissue.

Figure 2:
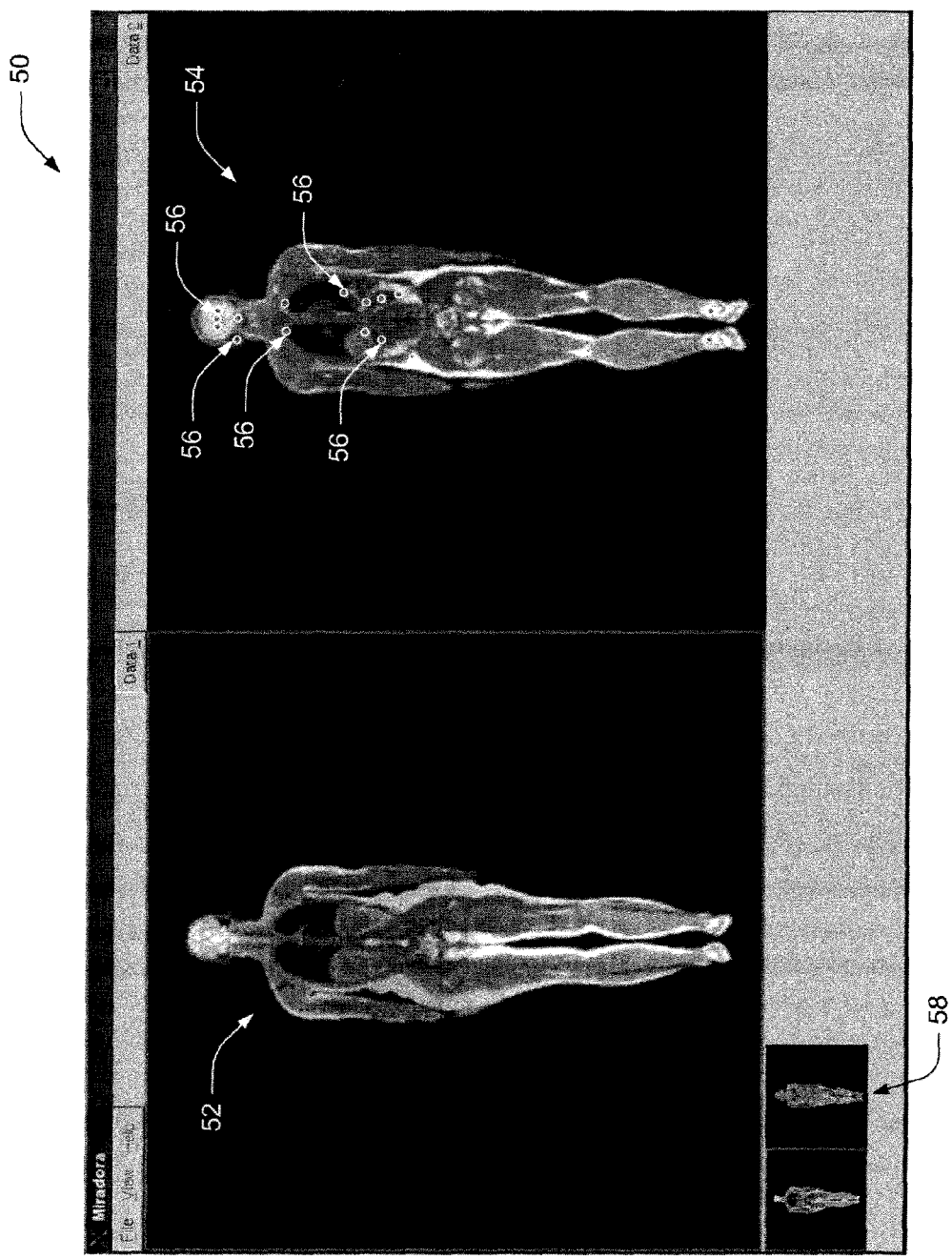
FIG. 2 illustrates a screenshot of a coarse manual alignment of a patient image to a reference image.

FIG. 2 illustrates a screenshot 50 of a coarse manual alignment of a patient image 52 to a reference image 54. For instance, given a reference segmentation (e.g., a list of points, surface meshes, etc.) and a reference image (e.g., space in which the points or meshes reside), the new patient image, subject to interactive segmentation, is loaded into the application and roughly manually aligned to the reference image. If the patient and reference image are of significantly different size, etc., a new, more similar reference image can be manually selected from the atlas 26. The user chooses to link both images, which establishes a transformation between the reference image and the new patient image that need not be anatomically meaningful initially, but rather is a rough approximation. To establish the transformation, various registrations with rotation, scaling, and translation (RST) transformations, affine transformations, thin plate splines, and the like are used. The reference image 54 is displayed with the reference segmentation in the upper right view port. In one embodiment, the reference segmentation is displayed with green dots or points that indicate pre-designated reference landmarks 56. The new patient image, which is subject to interactive segmentation, is shown in the upper left view port and has been roughly manually aligned with the reference image and selected to be linked with the reference image. The lower left two view ports are thumbnail previews 58 of the upper view ports.

Figure 3:
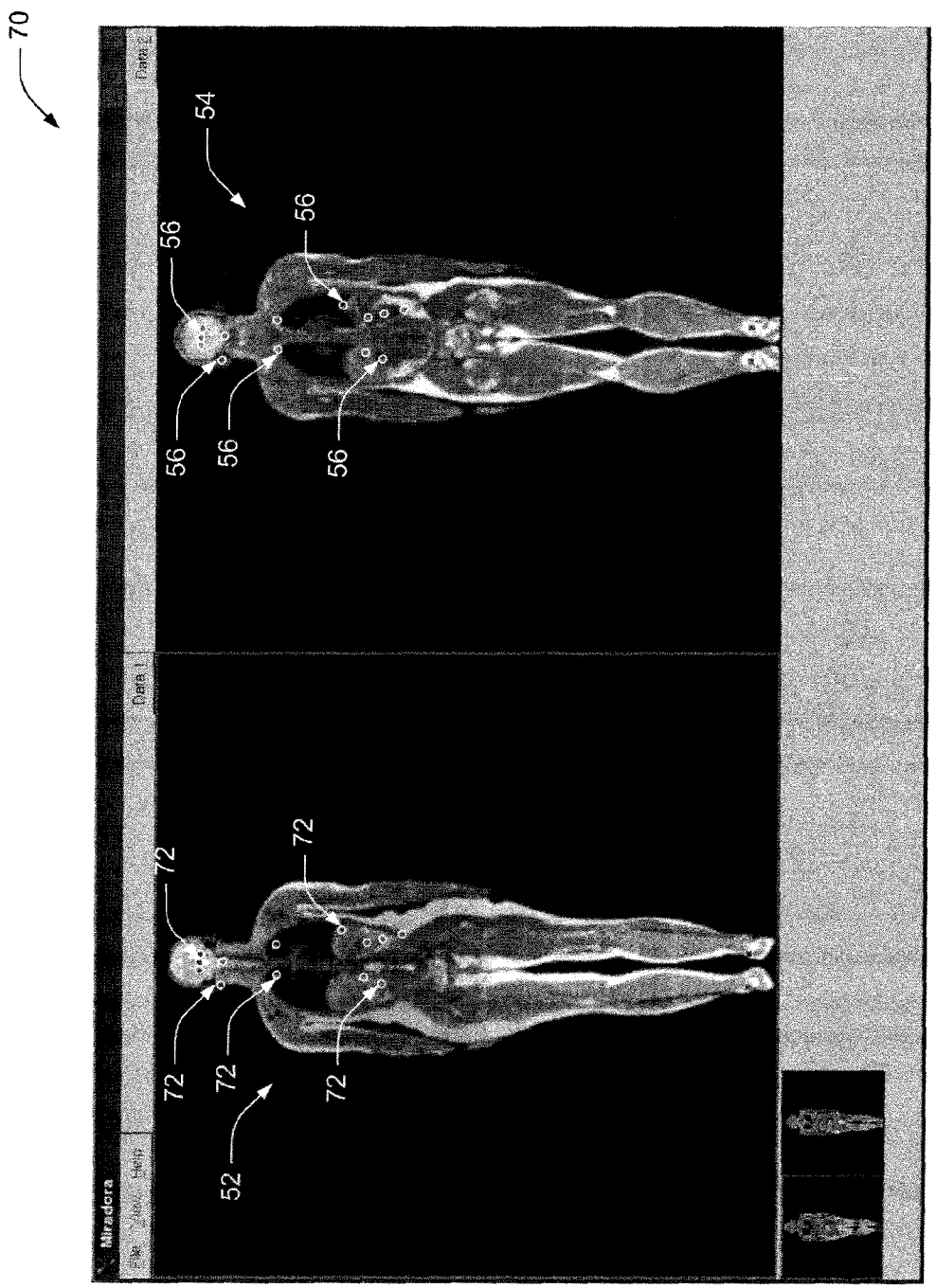
FIG. 3 illustrates a screenshot showing the patient image linked to the selected reference image, with pre-approved reference landmarks transferred onto the patient image.

FIG. 3 illustrates a screenshot 70 showing the patient image 52 linked to the selected reference image 54, with pre-approved reference landmarks transferred (e.g., superimposed) onto the patient image 52. According to the transformation, the reference segmentation (e.g., landmarks and/or meshes) is copied into the space occupied by the new image data. Unapproved patient landmarks 72, which correspond to the pre-designated reference landmarks 56, are illustrated on the patient image 52. Initially, none of the registration objects (patient landmarks 72) are marked as approved. Unapproved patient landmarks 72, which correspond to the pre-approved reference landmarks 56 on the reference image 54, are shown on the patient image 52. The reference segmentation image is thus propagated into the patient image. In one embodiment, the imported landmarks are a rigid copy of the pre-approved reference landmarks 56, such that many or all of the unapproved patient landmarks 72 in the patient image segmentation may or, more likely, may not be positioned at a desired anatomically meaningful position.

Figure 4:
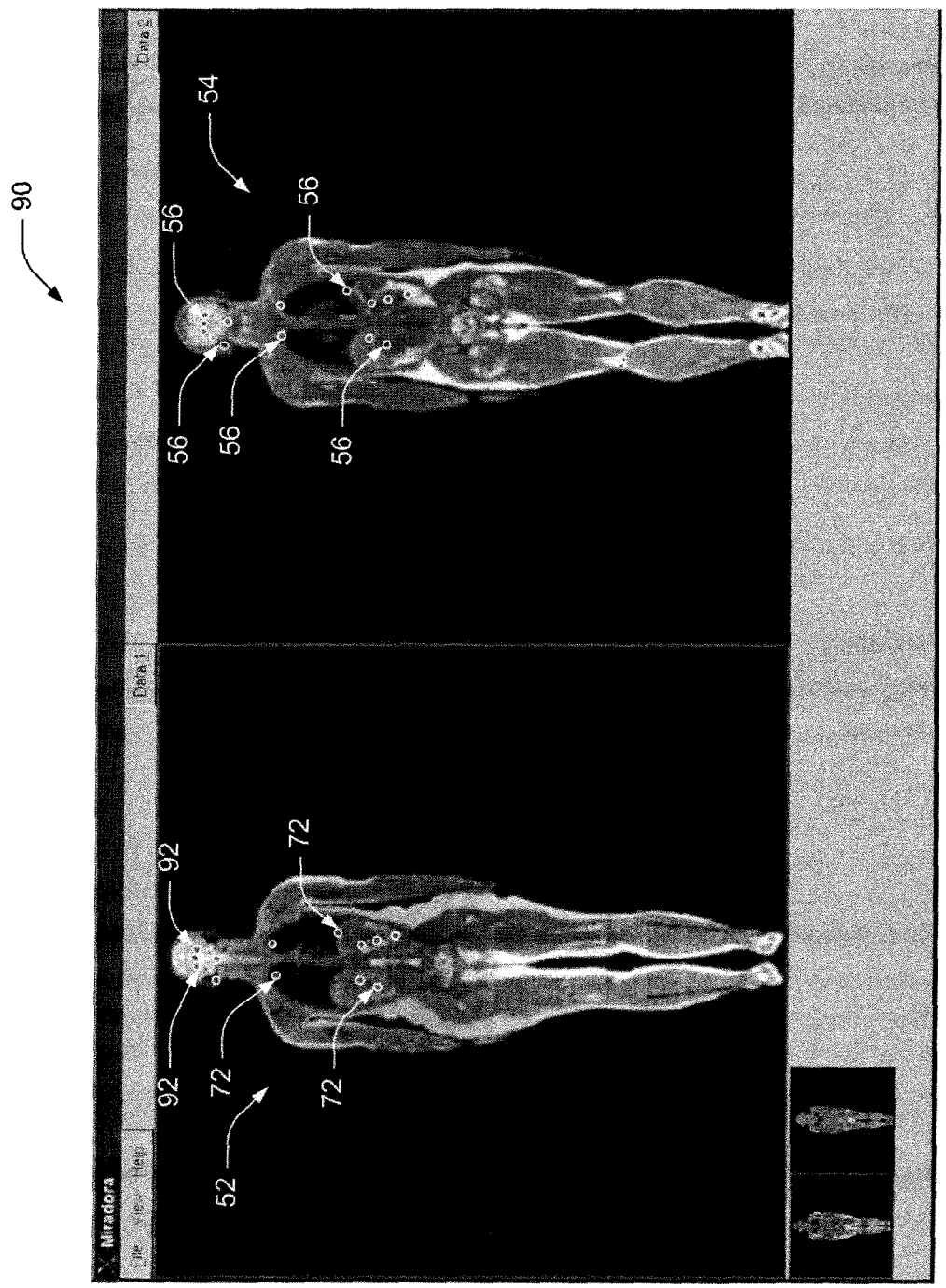
FIG. 4 illustrates a screenshot in which user-approved landmarks are shown after the user has moved the landmarks to a desired position on the patient image and approved the position of the landmarks.

FIG. 4 illustrates a screenshot 90 in which user-approved landmarks 92 are shown after the user has moved (e.g., dragged) the landmarks to a desired position on the patient image 52 and approved (e.g., checked to approve) the position of the landmarks. By interactively dragging, or pushing, the landmarks 72 (e.g., segmentation objects) to an anatomically meaningful position in the patient image data space, the user both defines the adapted landmarks as approved and accepts them (e.g., generating user-approved landmarks 92) to be used for calculating the interpolation of other unapproved landmarks 72. If segmentation interpolation is toggled "active" through the user interface, the position of any unapproved landmark 72 within the patient image 52 data is updated by a pre-selected registration algorithm (e.g., with thin plate splines or the like), based on the movement or position difference of corresponding pairs of approved landmarks from the new patient segmentation and the reference segmentation.

In one embodiment, unapproved landmarks 72 are displayed in a first color (e.g., red), while landmarks 92 that have been manually moved and accepted are displayed in a second color (e.g., green). Some of the landmarks in the new segmentation (left) have been manually adapted. Interpolation by thin plate splines of the unapproved patient landmarks 72 not already manually adapted can be activated, which moves the unaccepted landmarks based on the updated interpolation transform which normally moves them closer to the respective desired anatomical positions in the patient image relative to the reference image. Thus, by manipulating and accepting landmarks that are easily relocated, more complicated unapproved landmark position can be interpolated to reduce time spent by a user to precisely align all desired landmarks. Relocating the landmarks that are furthest out of place in each direction can align the closer landmarks.

In one embodiment, one or more landmarks 72 can be recommended to a user for manipulation and approval in a prescribed sequence, such as by enlarging the recommended landmark on the patient image to indicate to the user that approval of the recommended landmark will have a greater impact on reducing overall landmark approval complexity than approval of a non-recommended landmark. In this example, the system 10 (FIG. 1) recommends landmarks 72 to the user based in part on whether placement of the landmark will result in a high level of repositioning of other unapproved landmarks. That is, a landmark that will cause a relatively large amount of movement of other landmarks closer to their desired positions (e.g., after interpolation) is recommended over a landmark that will cause less movement of other landmarks.

Figure 5:
FIG. 5 shows another screenshot with examples of a patient image and a reference image with a refined geometry.

FIG. 5 shows another screenshot 110 with examples of a patient image 52 and a reference image 54 with a refined geometry. When the display geometry of the reference image is changed and image interpolation is turned on, the display geometry of the patient image is updated accordingly by registration based on the same pairs of points. The display geometry of the reference image 54 has been changed to allow for detail viewing in a particular region (e.g., the head). The display geometry of the patient image 52 is automatically aligned based on the registration of the already-accepted portion of the patient segmentation with the corresponding part of the reference segmentation, which facilitates cross-referencing between the reference image and the patient image data. In this manner, a number of user interactions can be minimized by building a user interface for progressive atlas adaptation.

Figure 6:
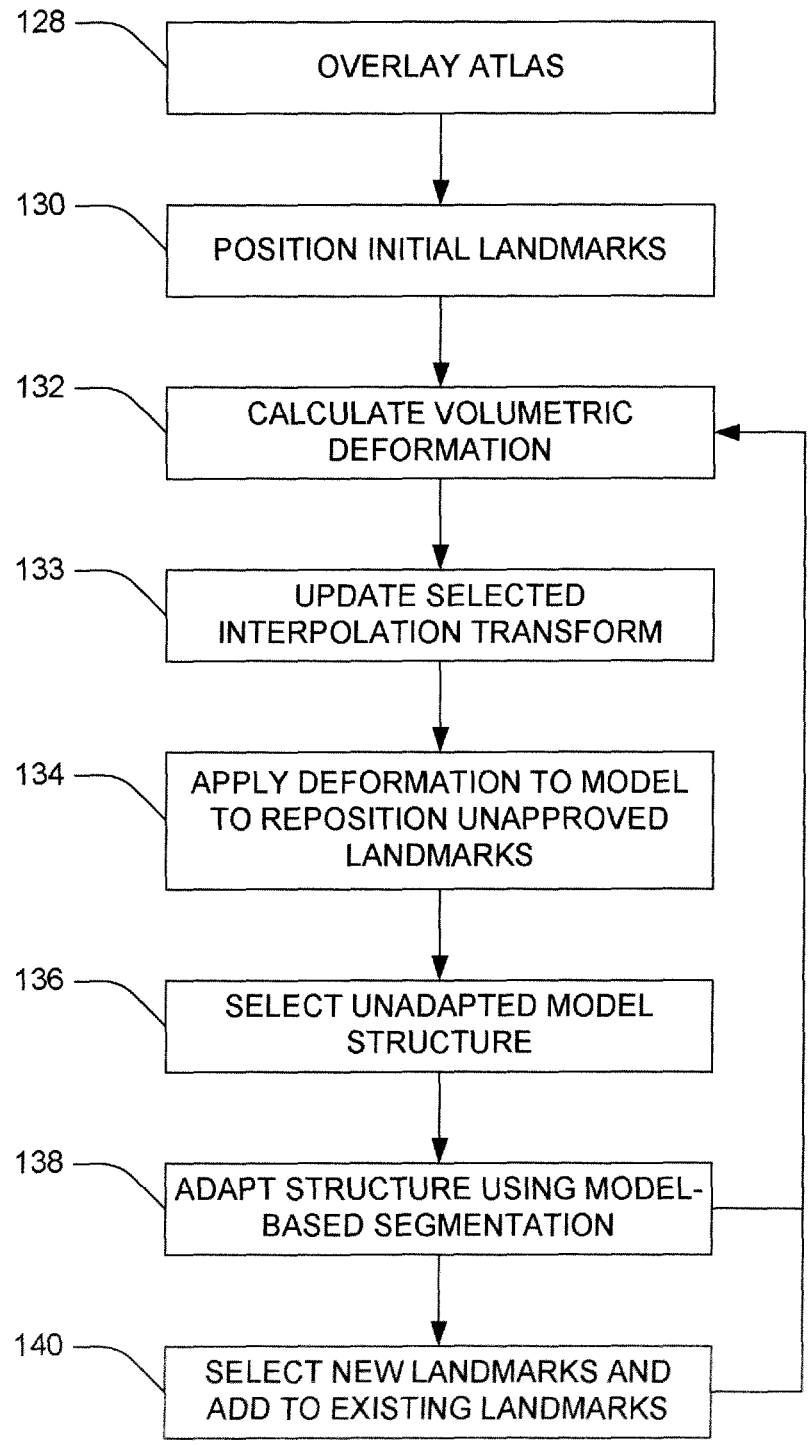
FIG. 6 illustrates a method for progressive image segmentation using a deformable anatomical atlas.

FIG. 6 illustrates a method for progressive image segmentation using a deformable anatomical atlas. In one embodiment, the deformable atlas is brought to a rough initial position in a patient image, and the selected structures from the atlas are automatically, semi-automatically or manually adapted to the image. The initialization of the remaining structures or landmarks is updated on-the-fly using the new updated positions of the adapted (e.g., accepted) structures or landmarks. The landmark acceptance and on-the-fly updating steps are repeated until the segmentation of all structures is confirmed by the user.

According to another embodiment, the deformable atlas of anatomical structures is first brought to an initial position (either automatically or manually) overlying an anatomical structure in a 3D patient image, at 128. The atlas can, for example, include one or more 3D organ (or other structure) models represented by triangulated meshes or the like. In the initial position, all structures of the atlas are first marked as "unconfirmed," for example by using certain color, line thickness, etc. The initial atlas-to-image mapping can be established, for example, by manually locating certain anatomical landmarks in the image and repositioning the corresponding landmarks in the model, etc., at 130.

At 132, volumetric deformation is calculated, for instance by determining 3D distances between the initial and accepted positions of the repositioned and accepted landmark pairs (e.g., corresponding landmarks on the patient image and the selected reference model(s), respectively). The calculated volumetric deformation is used to refine a selected interpolation transform, e.g., radial bias functions, elastic body splines, etc., at 133. The refined transformation is applied to the reference model, at 134, to reposition the reference model and the unapproved landmarks At 136, an unapproved landmark (e.g., a point or structure within the reference model) is selected. The unapproved landmark may be selected from a hierarchical list of landmarks or may be user-selected.

At 138, the models of the selected structures (e.g. skull, bones, and lungs in a CT-based head-and-neck atlas, etc.), which can be segmented automatically with minimum user interaction, are adapted, for example, using model-based segmentation technique. An example of a suitable model-based segmentation technique is described in, for instance, "Shape Constrained Deformable Models for 3D Medical Image Segmentation," (J. Weese, M. Kaus et al.; IPMI 2001: 380-387). After visual inspection, and optional local corrections, these structures are then marked as "confirmed" or "approved." After adaptation, one or more points derived from the adapted models can be used as further landmarks and added to the initial set of landmarks, at 140. In this manner, a precise atlas-to-image mapping can be obtained and used for re-initialization of the structures still unconfirmed.

The order in which the model landmarks or structures are processed can be established using prior knowledge about the anatomy and image modality, or by evaluating the precision of model initialization using certain quantitative measures such as alignment of surface normals of the model with image gradients. One or more of the models in the atlas can be used to provide supplemental information only, and need not be displayed explicitly if they can be adapted automatically. The progressive atlas adaptation is carried out with gradual increase in segmentation complexity until the segmentation results for all structures in the atlas are accepted by the user. That is, simpler segmentations are performed first. Additionally, this approach can be extended to multi-modality image segmentation, where the atlas structures segmented in a particular modality (e.g., magnetic resonance) support the model initialization and segmentation of the remaining structures in a secondary image of another modality (e.g., computed tomography) and vice versa.

Thus, according to the method, a volumetric deformation is calculated from a set of landmarks by using an interpolator (e.g., elastic body splines, thin plate splines, or some other suitable interpolator). The set of landmarks is gradually increased by iteratively adapting structures or landmarks (e.g., using model-based segmentation), selecting additional landmarks, recalculating a deformation, and applying it to the reference model(s). Structures and/or landmarks can be selected by the user interactively or from a predefined hierarchical model or list. Additionally, predefined structures need not be visible to the user.

According to an example, a patient with a swollen spleen may be imaged and an abdominal reference model may be selected (e.g., automatically or manually) and overlaid on the patient image model. A user aligns landmarks on the reference model with corresponding landmarks on the patient image, thereby enlarging the spleen structure(s) in the model. Nearby organs or structures in the model are then automatically adjusted (e.g., using interpolation) to accommodate the enlarged spleen. In this manner, the user need not adjust model landmarks for every anatomical structure in the model when registering the model to the patient image volume.

Figure 7:
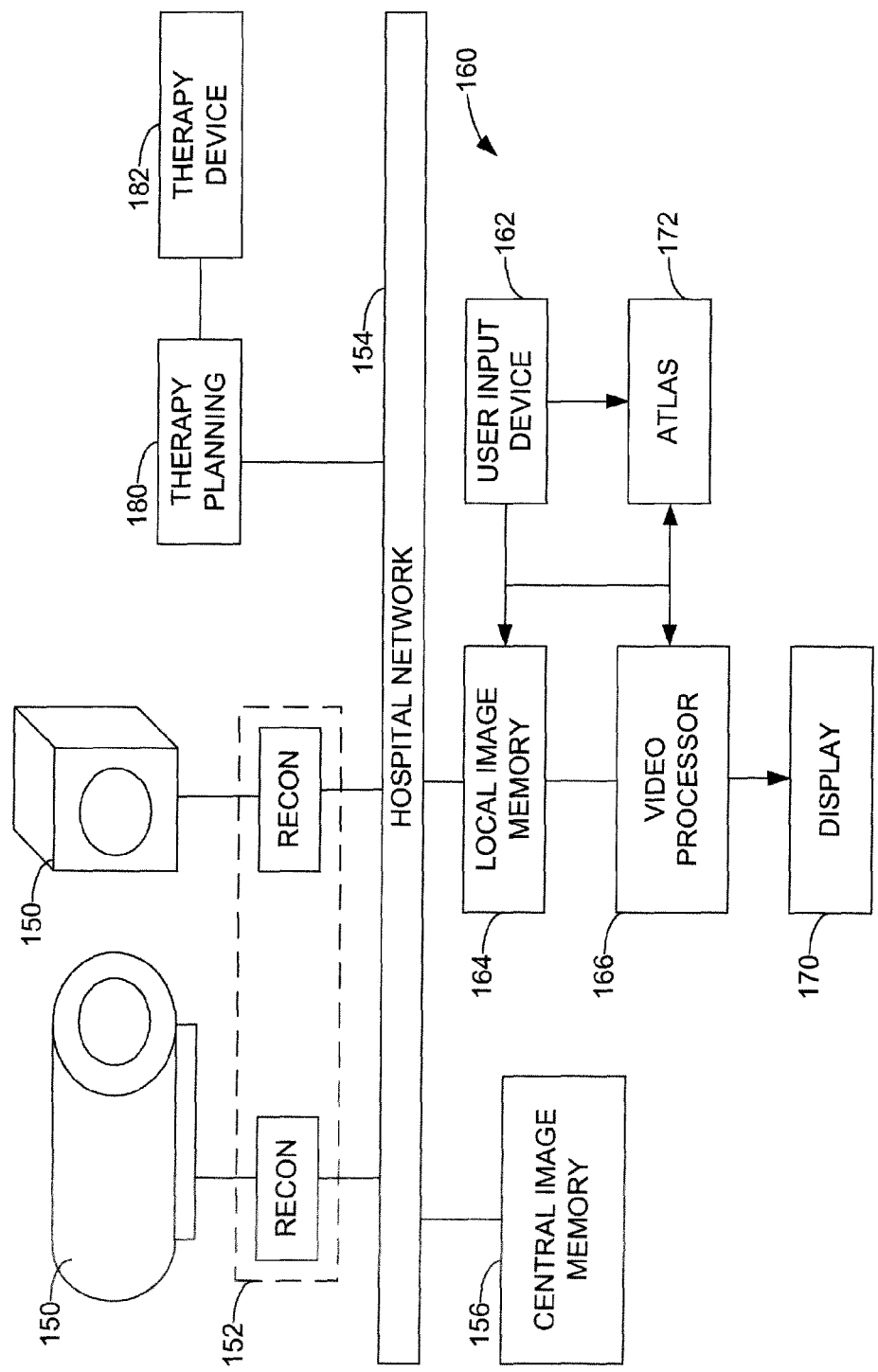
FIG. 7 illustrates an exemplary hospital system that includes a plurality of imaging devices, such as CT, MRI, or the like, which generate imaging data that are reconstructed by individual or shared reconstruction processors to generate 3D image representations.

With reference to FIG. 7, an exemplary hospital system may include a plurality of imaging devices 150, such as CT, MRI, or the like, which generate imaging data that are reconstructed by individual or shared reconstruction processors 152 to generate 3D image representations. The image representations are communicated over a network 154 to a central memory 156.

At a station 160 connected with the network, an operator uses an input device 162 to move a selected 3D patient image representation from the central memory to a local memory 164. A pre-generated reference model segmentation (e.g., a collection of landmarks) corresponding to the selected 3D patient image representation is also imported from an atlas 172 in the central memory or at the station 160 to the local memory, selected to approximately match the selected patient image volume either automatically or manually. A video processor 166 overlays the reference model segmentation on the patient image representation and displays the reference model and the patient image representation with overlaid landmarks on a monitor 170. The operator, through the input device 162, selects the landmarks to be "approved" on the patient image representation to be displayed.

To conform the reference model segmentation to the shape of one or more of the anatomical structures in the patient image, the operator uses the input device to select and manipulate the position of a landmark. Once the operator has positioned the landmark at a desired location on the patient image volume, the operator "approves" the landmark, which triggers updating of the interpolation transform and an interpolation using the updated transform of updated positions of other not-yet-approved landmarks on the patient image. The process of user approval of landmarks and interpolation is iteratively repeated until the user is satisfied that the reference model segmentation sufficiently conforms to the patient image volume. The user may then indicate approval of the entire model segmentation on the patient image volume, including user-approved landmarks and unapproved landmarks whose positions have been interpolated based on the user-positioned approved landmarks. Optionally, another image of the same region of the same patient, but generated with a different imaging modality can be retrieved from the central memory and used to further refine the interpolation transform.

The user-approved model can be stored in the central memory 156, the local memory 164, or used directly in another process. For instance, a therapy planning (e.g., radiation, ablation, etc.) station 180 can use the approved patient model to plan a therapy session. Once planned to the satisfaction of the operator, the planned therapy is transferred to a therapy device 182 that implements the planned session. Other stations may use the shaped contour in various other planning processes.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

The invention claimed is:

1. A system for interpolation of medical image segmentation landmarks, including:
   a memory that stores 3D reference image volumes of anatomical structures, the reference image volumes each including a set of reference landmarks;
   a display that presents a view of a patient image volume and a view of a reference image volume;
   a processor that overlays the set of reference landmarks of the reference image volume and the patient image volume; and
   a user input device that a user employs to reposition one or more of the overlaid landmarks in a corresponding position on the patient image and approve the one or more repositioned landmarks;
   wherein the processor updates an interpolation transform between the reference image volume and the patient image volume as a function of the repositioning of the one or more approved landmarks, and updates the positions of one or more unapproved overlaid landmarks in accordance with the updated interpolation transform.

2. The system according to claim 1, wherein bone tissue is being segmented and the interpolation transform includes a principle component analysis transform.

3. The system according to claim 1, wherein brain tissue is being segmented and the interpolation transform includes a rigid transform.

4. The system according to claim 1, wherein soft tissue is being segmented and the interpolation transform includes an elastic transform.

5. The system according to claim 1, wherein each 3D reference image volume is constructed using anatomical structure data from a plurality of patient image volume representations.

6. The system according to claim 1, wherein the processor recommends unapproved landmarks for repositioning and approval by the user.

7. The system according to claim 6, wherein the processor recommends the unapproved landmark based at least in part on a magnitude of an effect that the recommended landmark will have on interpolation of updated positions for other unapproved landmarks, once the recommended landmark is approved.

8. The system according to claim 1, wherein the processor updates positions of all remaining unapproved landmarks whenever an unapproved landmark becomes an approved landmark.

9. The system according to claim 1, wherein the reference image volume is stored in and selected from an atlas.

10. The system according to claim 1, wherein the processor is configured to:
    retrieve the set of reference landmarks and the reference image volume;
    transpose the set of reference landmarks onto the patient image volume as unapproved landmarks;
    receive input related to repositioning of at least one unapproved landmark;
    receive input updating the status of the repositioned landmark as an approved landmark;
    adjust the interpolation transform as a function of the change in position of the approved landmark; and
    update the positions of remaining unapproved landmarks as a function of the interpolation transform.

11. A method for interactively updating a segmentation of the patient image volume with the system of claim 1, including:
    retrieving the set of reference landmarks and the reference image volume;
    transferring the set of reference landmarks onto the patient image volume as unapproved landmarks;
    receiving input related to repositioning of at least one unapproved landmark;
    receiving input updating the status of the repositioned landmark as an approved landmark;
    adjusting the interpolation transform as a function of the change in position of the approved landmark position; and
    updating the positions of remaining unapproved landmarks as a function of the interpolation transform.

12. A method of interactively updating a segmentation of a patient image volume, including:
    retrieving a reference image segmentation comprising a set of reference landmarks on the reference image volume;
    transferring the set of reference landmarks onto the patient image volume as unapproved landmarks in a patient image volume segmentation;
    receiving input related to repositioning of at least one unapproved landmark;
    receiving input updating the status of the repositioned landmark as an approved landmark;
    interpolating position updates for remaining unapproved landmarks as a function of the position of the approved landmark position; and
    updating the positions of remaining unapproved landmarks as a function of the interpolation.

13. The method according to claim 12, further including interpolating position updates using a principle component analysis transform for unapproved landmarks corresponding to bone tissue in the patient image volume.

14. The method according to claim 12, further including interpolating position updates using a rigid transform for unapproved landmarks corresponding to brain tissue in the patient image volume.

15. The method according to claim 12, further including interpolating position updates using an elastic transform for unapproved landmarks corresponding to soft tissue in the patient image volume.

16. The method according to claim 12, further including recommending an unapproved landmark for repositioning and approval by a user.

17. The method according to claim 16, further including recommending the unapproved landmark based at least in part on a magnitude of an effect that the recommended landmark will have on interpolation of updated positions for other unapproved landmarks, once the recommended landmark is approved.

18. The method according to claim 12, performed iteratively until a predetermined number of approved landmarks has been attained.

19. The method according to claim 18, further including receiving input indicating acceptance of all remaining unapproved landmarks once the predetermined number of approved landmarks has been attained.

20. The method according to claim 18, further including generating a therapy plan using the updated patient image volume segmentation.

21. The method according to claim 12, wherein an atlas includes a plurality of reference image volumes of different anatomical structures, different sized reference image volumes of a one or more anatomical structure, and/or reference image volumes of one or more different combinations of anatomical structures.

22. A processor or non-transitory computer-readable medium programmed to perform the method of claim 12.

23. The method according to claim 12, wherein the reference image volume is retrieved from an atlas of reference image volumes.

24. An interactive patient image volume registration apparatus, including:
- a display on which is presented a reference image volume segmentation, overlaid on a patient image volume image, to a user;
- a user input device configured to permit a user to select an unapproved landmark overlaid on the patient image volume, reposition the selected unapproved landmark, and approve the repositioned unapproved landmark; and
- a processor configured to iteratively interpolate new positions for remaining unapproved landmarks as a function of position of each approved landmark, and updating the positions of the remaining unapproved landmarks;
- wherein the user input device is further configured to permit a user to approve all remaining unapproved landmarks when the user is satisfied with the adaptation of the patient image volume segmentation.

25. The apparatus according to claim 24, wherein the reference image volume segmentation is selected from an atlas of reference image volume segmentations.

* * * * *